(12) United States Patent
Lee

(10) Patent No.: US 7,226,318 B1
(45) Date of Patent: Jun. 5, 2007

(54) CARD ADAPTER STRUCTURE

(76) Inventor: Yun-Hsiu Lee, 15F., No. 88, Hsing-De Rd., San Chung, Taipei Hsien (TW)

( * ) Notice: Subject to any disclaimer, the term of this patent is extended or adjusted under 35 U.S.C. 154(b) by 0 days.

(21) Appl. No.: 11/488,710

(22) Filed: Jul. 19, 2006

(51) Int. Cl.
*H01R 24/00* (2006.01)
(52) U.S. Cl. ........................................ 439/630; 361/737
(58) Field of Classification Search ................ 439/638, 439/630, 945; 361/737
See application file for complete search history.

(56) References Cited

U.S. PATENT DOCUMENTS

| | | | | |
|---|---|---|---|---|
| 6,364,713 B1 * | 4/2002 | Kuo | ............................ | 439/638 |
| 6,524,137 B1 * | 2/2003 | Liu et al. | ..................... | 439/638 |
| 6,641,413 B2 * | 11/2003 | Kuroda | ........................ | 439/159 |
| 6,721,186 B2 * | 4/2004 | Yang | ........................... | 361/737 |
| 6,783,399 B2 * | 8/2004 | Joung | .......................... | 439/630 |
| 6,932,652 B1 * | 8/2005 | Chen | ........................... | 439/630 |
| 6,969,281 B2 * | 11/2005 | Lai | .............................. | 439/630 |
| 7,040,928 B1 * | 5/2006 | Lai et al. | ..................... | 439/630 |
| 7,063,571 B2 * | 6/2006 | Yu | ............................... | 439/630 |
| 7,094,106 B2 * | 8/2006 | Yamamoto et al. | ......... | 439/630 |

\* cited by examiner

*Primary Examiner*—Neil Abrams
*Assistant Examiner*—Harshad C Patel
(74) *Attorney, Agent, or Firm*—Troxell Law Office, PLLC

(57) ABSTRACT

The present invention provides a card adapter structure including an upper cover, a lower cover, a set of converter terminals and a set of positioning flexible strips. The upper cover designed to conform to short memory card (MS) specifications, has an insertion slot defined at a rear end to fit the shape of a memory stick micro card (M2). Fixing portions are located on two sides of the insertion slot; moreover, a positioning structure is located on a bottom surface of the upper cover. The converter terminals are configured and covered fixedly with an injection molded fixed seating. The set of positioning flexible strips are correspondingly disposed between the fixing portions of both covers. Such a structural configuration enables converting a memory stick micro card into a short memory card to facilitate inserting into a digital product provided with a short memory card circuit port for use thereof.

3 Claims, 6 Drawing Sheets

CARD ADAPTER STRUCTURE

BACKGROUND OF THE INVENTION (a) Field of the Invention

The present invention relates to an improved card adapter structure, and more particularly to a card adapter structure that uses an assembled configuration including an upper cover, a lower cover, a set of converter terminals and a set of positioning strips to enable converting a memory stick micro card of relatively small size into a short memory card of relatively larger size that can be inserted into a digital product having a short memory card circuit port for use thereof. Hence, the present invention has the effectiveness of providing a structure that can be simply and quickly assembled, enables solid emplacement of component members, will not easily deform, saves on costs, has stable quality and excellent heat dissipation and is convenient to use, and is applicable for use in a variety of card adaptors or similar structures.

(b) Description of the Prior Art

The current popularity of 3C (computer, communications and consumer electronics) digital products, such as digital cameras, PDAs (personal digital assistants), MP3 (media player) personal stereos, have driven the vigorous development of flash memory cards and the derivation of a variety of memory cards having different size, form and specifications. The current most common memory card specifications include SM (Smart Media), xD-Picture Card, CF (Compact Flash), MD (Micro Drive), MS (Memory Stick) and SD (Secure Digital), MMC (Multi Media Card), and so on. However, with the increasing miniaturization of 3C digital products, manufacturers have released mini memory cards having substantially smaller size specifications, including the MS and MS PRO (Memory Stick PRO) extended Duo series, and the extended miniSD, RS-MMC (Reduced Size Multi Media Card) and Transflash derived from the SD and MMC specifications. The Transflash card, however, is still the smallest memory card in the current market, and the MS and MS PRO camps are actively promoting a memory stick micro card (Memory Stick Micro, M2) similar to that of the Transflash card. Nevertheless, continuous miniaturization of memory cards occupies a small area of the core market, and size of each type of memory card having different structural form and specifications differs or configuration of circuit port contact points varies.

Referring to FIG. 1, which shows a circuit port of a current memory stick micro card (M2) a provided with eleven gold contact points a1 and a circuit port of a short memory card (MS) b configured with ten gold contact points b1, one less than the memory stick micro card (M2), wherein a first and second gold contact point a1 of the memory stick micro card (M2) a are temporarily non-functional, and a first and tenth gold contact point b1 of the short memory card (MS) b are configured with the same function. Hence, the inventor of the present invention having accumulated years of experience in related arts, attentively and circumspectly carried out extensive study and exploration to ultimately design a new improved card adapter structure that facilitates converting the relatively small sized memory stick micro card (M2) into a relatively larger sized short memory card (MS) to facilitate inserting into a digital product provided with a short memory card (MS) circuit port for use thereof.

SUMMARY OF THE INVENTION

A primary objective of the present invention is to provide an improved card adapter structure that uses a structural assembly of an upper cover, a lower cover, a set of converter terminals and a set of positioning flexible strips to enable converting a memory stick micro card of relatively small size into a short memory card of relatively larger size to facilitate inserting into a digital product provided with a short memory card circuit port for use thereof, thereby achieving effectiveness of providing a structure that can be simply and quickly assembled, enables solid emplacement of component members and is convenient to use, and substantially improving practicability and convenience of the entire configuration.

Another objective of the present invention is to provide the improved card adapter structure with a structural configuration that enables a plastic injection molded fixed seating to fixedly cover each terminal of the set of converter terminals, thereby firmly positioning each of the terminals of the set of converter terminals, and to use a plurality of slots defined in the fixed seating, to provide for cutting out connecting sections between each of the terminals after the fixed seating has been molded and prevent deformation due to assembly stress, moreover, provide the improved card adapter structure with a structural configuration that is in accordance with requirements for fast production and stable quality, and improves practicability of the entire configuration.

Yet another objective of the present invention is to provide the improved card adapter structure with a structural configuration wherein each of the terminals of the set of converter terminals supersedes the gold contact points of a traditional circuit board, thereby reducing quality control problems caused by multi-operation assembly, and providing a substantial saving on costs.

Yet another objective of the present invention is to provide the improved card adapter structure with a structural configuration wherein the plurality of slots defined in the fixed seating simultaneously provide an excellent heat dissipation effect which increase safety and practicability of the entire structural configuration.

In order to achieve the aforementioned objectives, the card adapter structure of the present invention comprises an upper cover, a lower cover, a set of converter terminals and a set of positioning flexible strips. The upper cover has an external form designed to conform to short memory card (MS) specifications, and an insertion slot is defined at a rear end of the upper cover corresponding to the shape of a memory stick micro card (M2). Fixing portions are located on two sides of the insertion slot; moreover, a positioning structure is located on a bottom surface of the upper cover. The lower cover has an external form designed to conform to short memory card (MS) specifications, and a front end of the lower cover is configured with a short memory card (MS) port. An opening is defined at a rear end of the lower cover to accommodate a memory stick micro card (M2), and fixing portions are located on two sides of the opening. Moreover, a positioning structure is located on edges of the lower cover corresponding to the upper cover. The set of converter terminals is configured with ten terminals, and an injection molded fixed seating fixedly covers each of the terminals of the set of converter terminals. Ten electrical contact points extend outward towards the short memory card (MS) port, and nine electrical contact points extend outward towards the memory stick micro card (M2) opening. The set of positioning flexible strips are correspondingly disposed between the fixing portions of the lower cover and the upper cover. Such a structural configuration enables converting a memory stick micro card of relatively small size into a short memory card of relatively larger size to facilitate inserting into a digital product provided with a short memory card circuit port for use thereof. Hence, the present invention has the effectiveness of providing a structure that can be simply and quickly assembled, enables solid emplacement of component members, will not easily deform, saves on costs, has stable quality and excellent heat dissipation and is convenient to use, thereby improving practicability, convenience and safety of the entire structural configuration.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
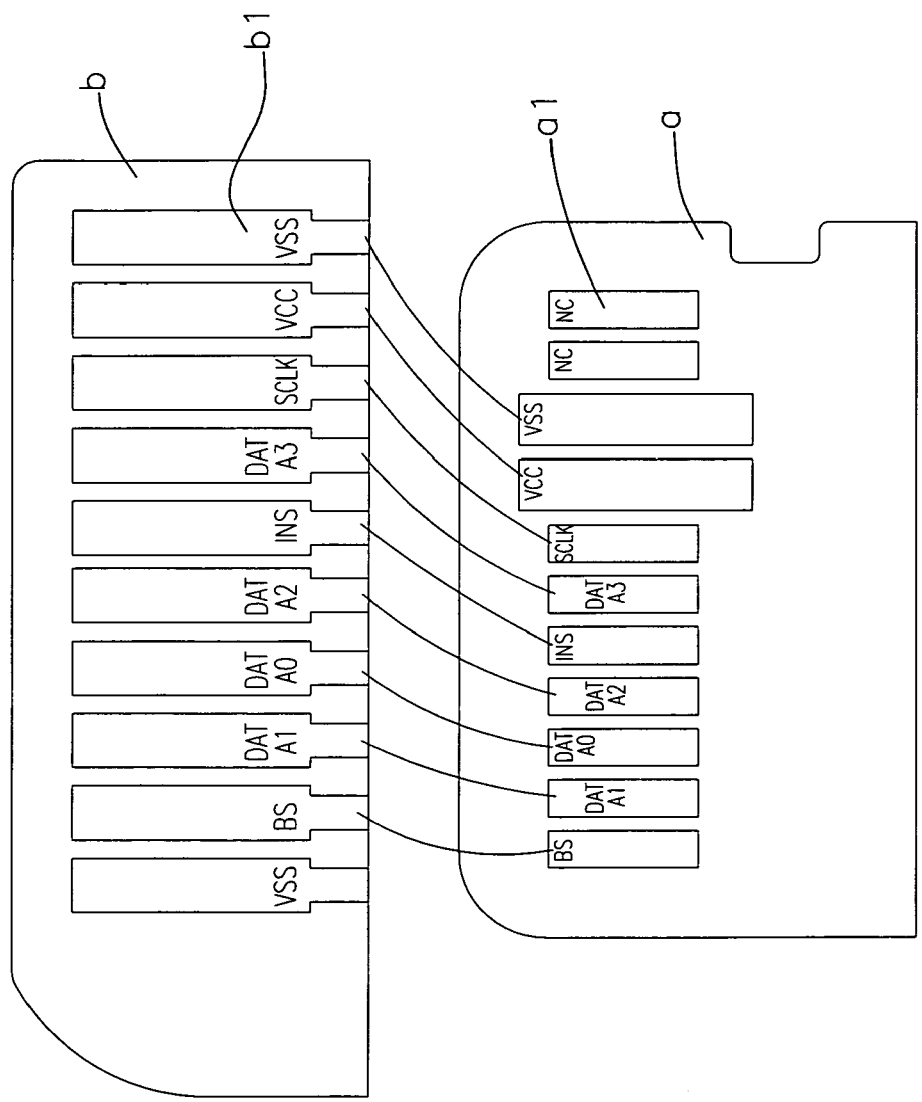
FIG. 1 shows a schematic view depicting electrical connections between a memory stick micro card (M2) and a short memory card (MS) of prior art.
Figure 2:
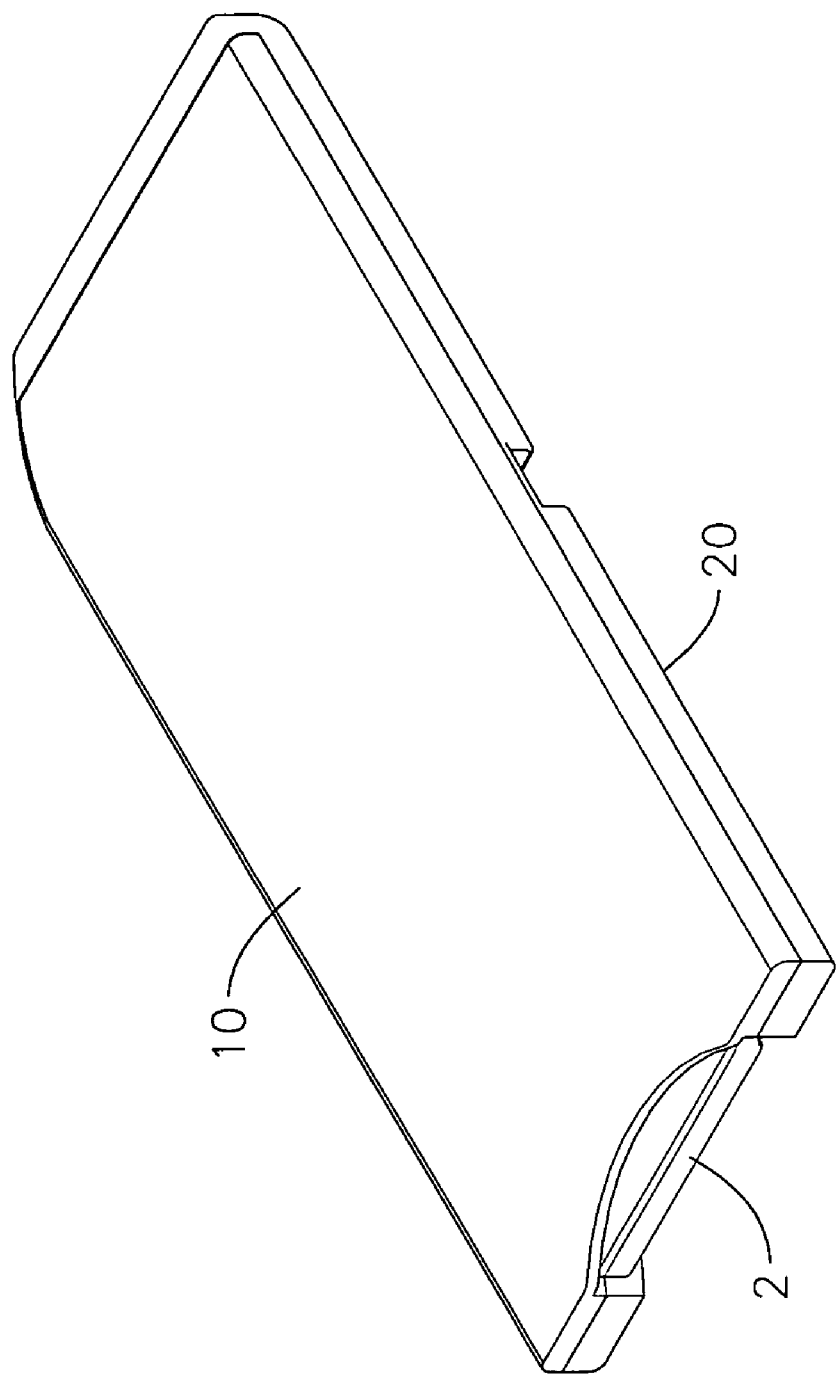
FIG. 2 shows an elevational view of an embodiment according to the present invention.
Figure 3:
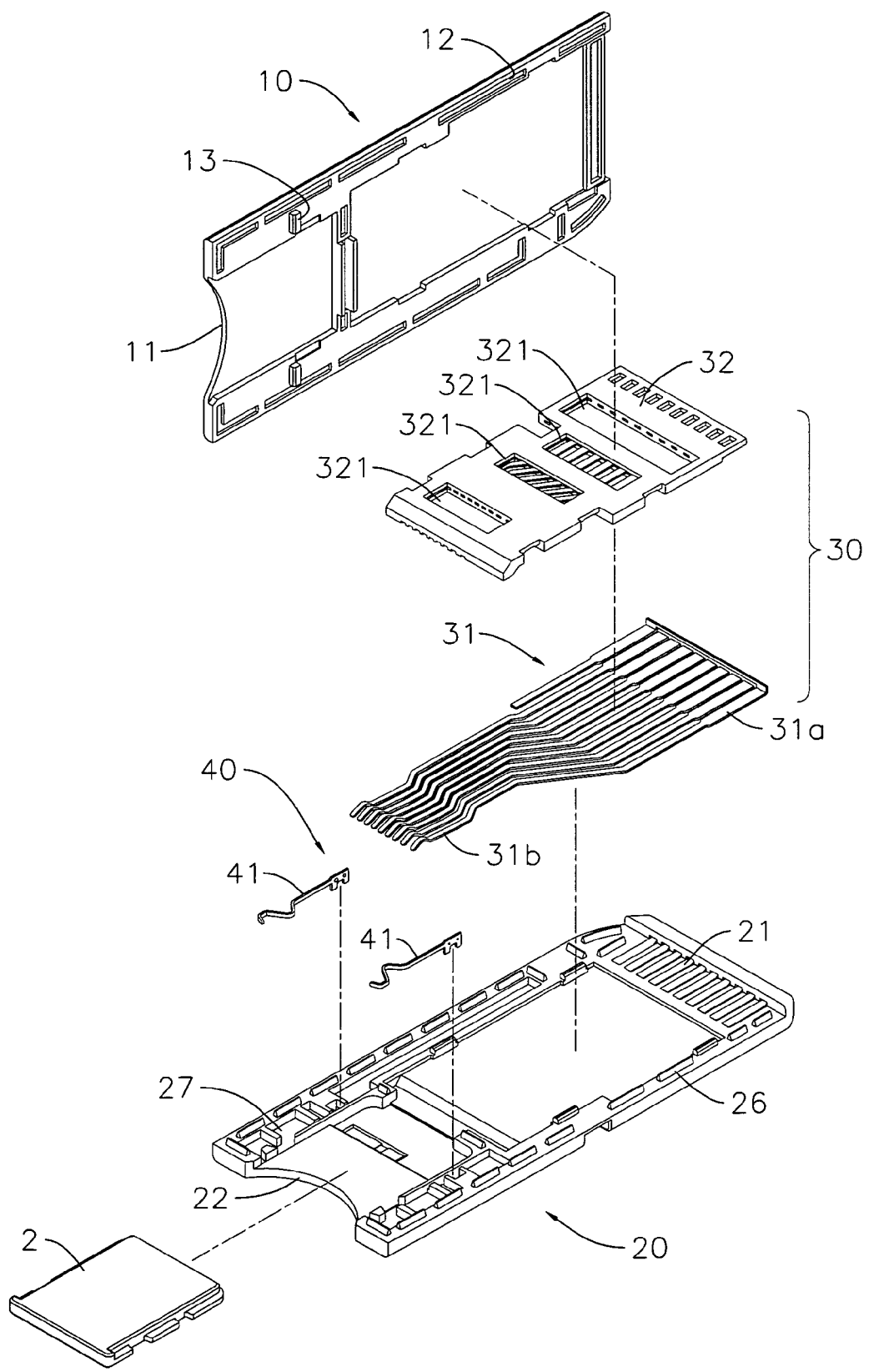
FIG. 3 shows an exploded elevational view of the embodiment according to the present invention.
Figure 4:
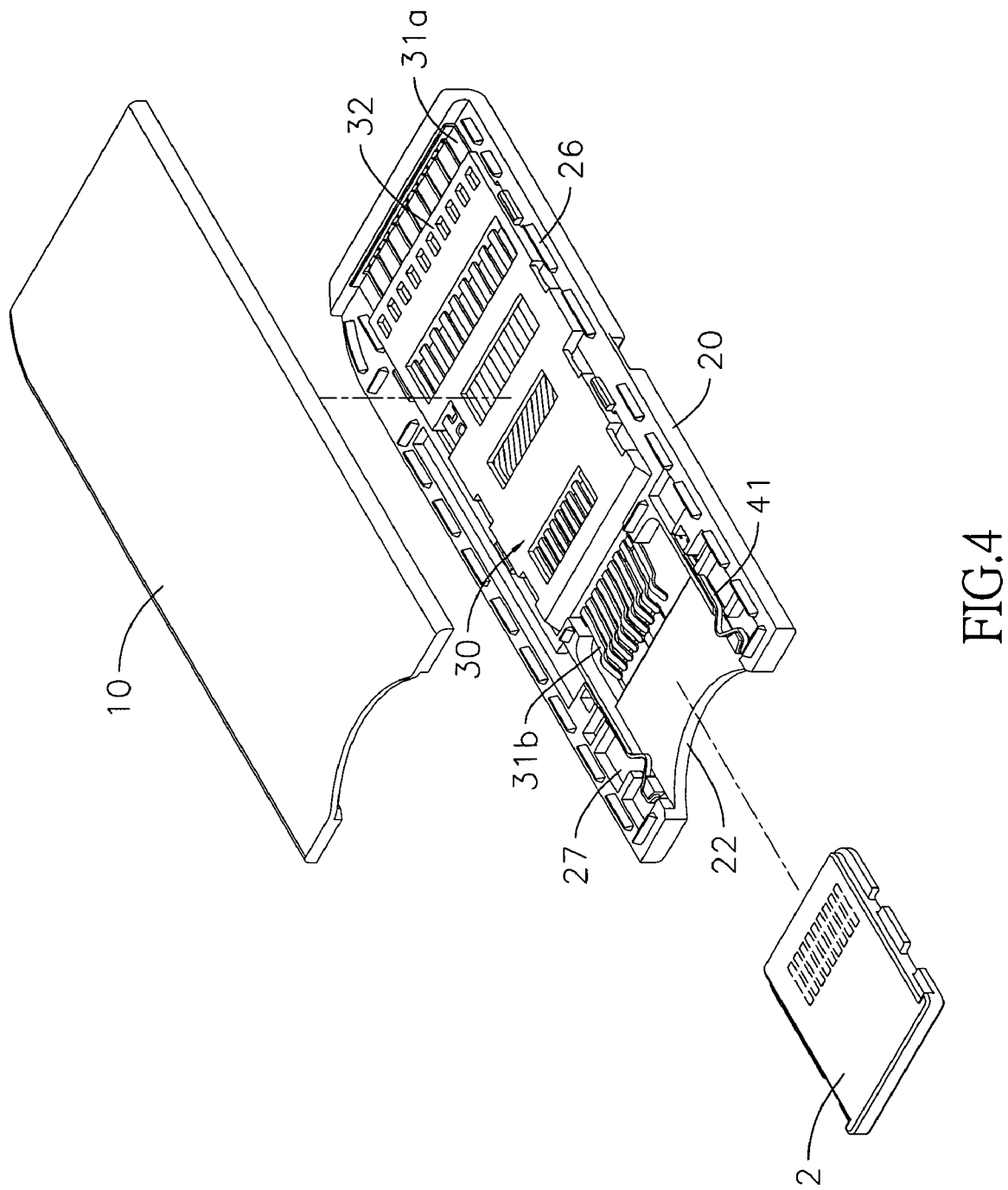
FIG. 4 shows a schematic view of the embodiment being combined with the memory stick micro card (M2) according to the present invention.
Figure 5:
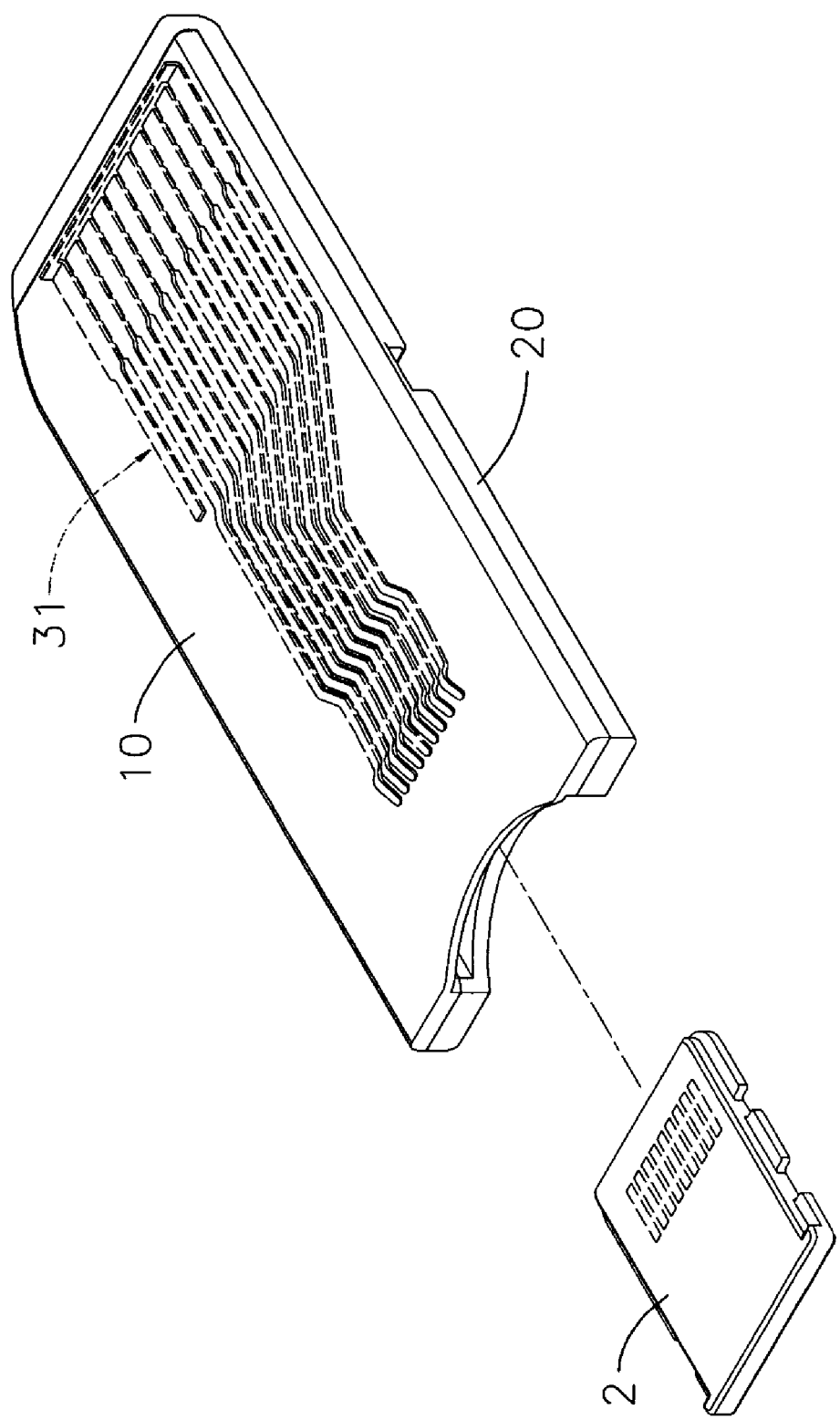
FIG. 5 shows a schematic view of the embodiment in use according to the present invention.
Figure 6:
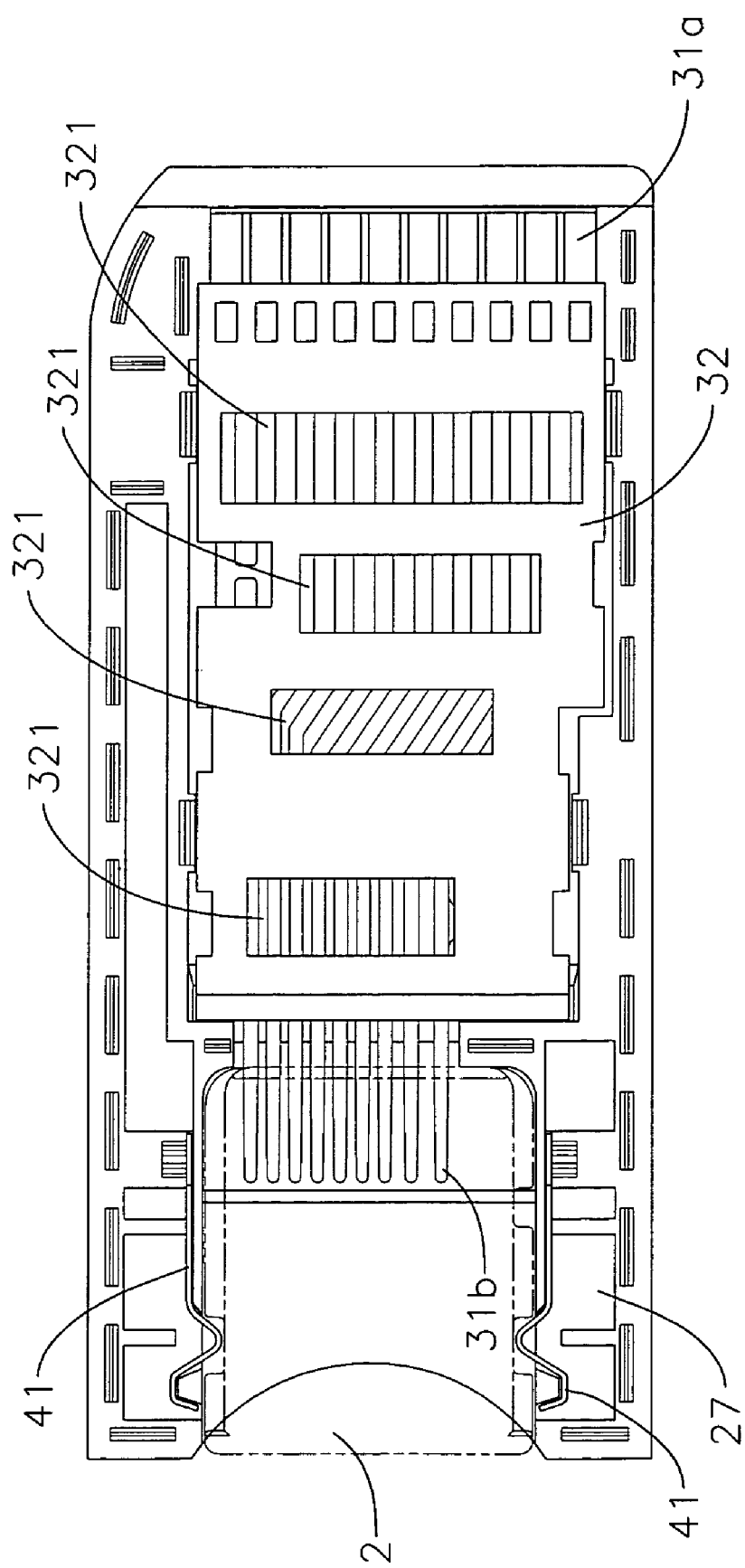
FIG. 6 shows a plane schematic view of the embodiment combined with the memory stick micro card (M2) according to the present invention.

Referring to FIGS. 2, 3, 4, 5 and 6, which show an improved card adapter structure of the present invention comprising:

An upper cover 10 having an external form designed to conform to short memory card (MS) specifications. An insertion slot 11 is defined at a rear end of the upper cover 10 corresponding to the shape of a memory stick micro card (M2), and fixing portions 13 are located on two sides of the insertion slot 11. Moreover, a positioning structure 12 is located on a bottom surface of the upper cover 10.

A lower cover 20 having an external form designed to conform to short memory card (MS) specifications. A front end of the lower cover 20 is configured with a short memory card (MS) port 21, and an opening 22 is defined in a rear portion of the lower cover 20 to accommodate a memory stick micro card (M2) therein. Fixing portions 27 are located on two sides of the opening 22, and a positioning structure 26 is located on edges of the lower cover 20.

A set of converter terminals 30 is configured with ten terminals 31 and an injection molded fixed seating 32 fixedly covers each of the terminals 31 of the set of converter terminals 30. Ten electrical contact points 31a extend outward towards the short memory card (MS) port 21, and nine electrical contact points 31b extend outward towards the memory stick micro card (M2) opening 22. Furthermore, a plurality of slots 321 are defined in the fixed seating 32, which provide for cutting out connecting sections between each of the terminals 31 after the fixed seating 32 has been molded and for heat dissipation.

A set of positioning flexible strips 40 comprising flexible strips 41 formed with two kinks that are respectively correspondingly disposed between the fixing portions 13 of the upper cover 10 and the fixing portions 27 of the lower cover 20, thereby enabling a memory stick micro card 2 (M2) to be clamped and positionally fixed therewith.

According to the aforementioned structural configuration of the improved card adapter structure of the present invention, as depicted in FIGS. 2, 3, 4, 5 and 6, the present invention is characterized in that structural assembly of the upper cover 10, the lower cover 20, the set of converter terminals 30 and the set of positioning flexible strips 40 enables the injection molded fixed seating 32 to fixedly cover each of the terminals 31 of the set of converter terminals 30, thereby firmly positioning each of the terminals 31 of the set of converter terminals 30, Furthermore, the plurality of slots 321 defined in the fixed seating 32 provide for cutting out connecting sections between each of the terminals 31 after the fixed seating 32 has been molded and prevent deformation due to assembly stress, moreover, is in accordance with requirements for fast production and stable quality. In addition, the plurality of slots 321 defined in the fixed seating 32 simultaneously provide an excellent heat dissipation effect.

Furthermore, the positioning structure 26 configured on the edges of the lower cover 20 corresponding to the positioning structure 12 of the upper cover 10 enable the upper cover 10 to be firmly joined to the lower cover 20 therewith. Each of the terminals 31 of the set of converter terminals 30 supersedes the gold contact points of a traditional circuit board, thereby reducing quality control problems caused by multi-operation assembly, and providing a substantial saving on costs. Furthermore, the ten terminals 31 of the set of converter terminals 30 are fixedly covered using the plastic injection molded fixed seating 32, and the ten electrical contact points 31a extending outward towards the short memory card (MS) port 21 and the nine electrical contact points 31b extending outwards toward the memory stick micro card (M2) opening 22 enable achieving converting the memory stick micro card (M2) of relatively small size into the short memory card (MS) of relatively larger size to facilitate inserting into a digital product provided with a short memory card (MS) circuit port for use thereof. Hence, the present invention has the effectiveness of providing a structure that can be simply and quickly assembled, enables solid emplacement of component members, will not easily deform, saves on costs, has stable quality and excellent heat dissipation and is convenient to use, thereby increasing practicability, convenience and safety of the entire configuration.

According to the aforementioned detailed description, persons familiar with related art are able to easily understand that the present invention can clearly achieve the aforementioned objectives, and evidently complies with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A card adapter structure comprising:

an upper cover having an external form designed to conform to short memory card (MS) specifications, an insertion slot is defined at a rear end of the upper cover corresponding to the shape of a memory stick micro card (M2), and fixing portions are located on two sides of the insertion slot, moreover, a positioning structure is located on a bottom surface of the upper cover; a lower cover having an external form designed to conform to short memory card (MS) specifications, a front end of the lower cover is configured with a short memory card (MS) port, and an opening is defined at a rear end of the lower cover to accommodate a memory stick micro card (M2) therein, fixing portions are located on two sides of the opening, and a positioning structure is located on edges of the lower cover; a set of converter terminals configured with ten terminals, and an injection molded fixed seating fixedly covers each of the terminals of the set of converter terminals, ten electrical contact points extend outward towards the short memory card (MS) port, the set of converter terminals further comprising nine electrical contact points extending outward towards the memory stick micro card (M2) opening; and a set of positioning flexible strips that is correspondingly disposed between the fixing portions of the upper cover and the lower cover; whereby the memory stick micro card (M2) of relatively small size is converted to the short memory card (MS) of relatively larger size, thereby facilitating inserting into a digital product provided with a short memory card (MS) circuit port for use thereof.

2. The card adapter structure according to claim 1, wherein a plurality of slots are defined in the fixed seating, which provide for cutting out connecting sections between each of the terminals after the fixed seating has been molded and for heat dissipation.

3. The card adapter structure according to claim 1, wherein the set of positioning flexible strips comprise flexible strips formed with two kinks that are correspondingly disposed between the fixing portions of the upper cover and the lower cover, thereby enabling a memory stick micro card (M2) to be clamped and positionally fixed therewith.

* * * * *